Patented June 21, 1949

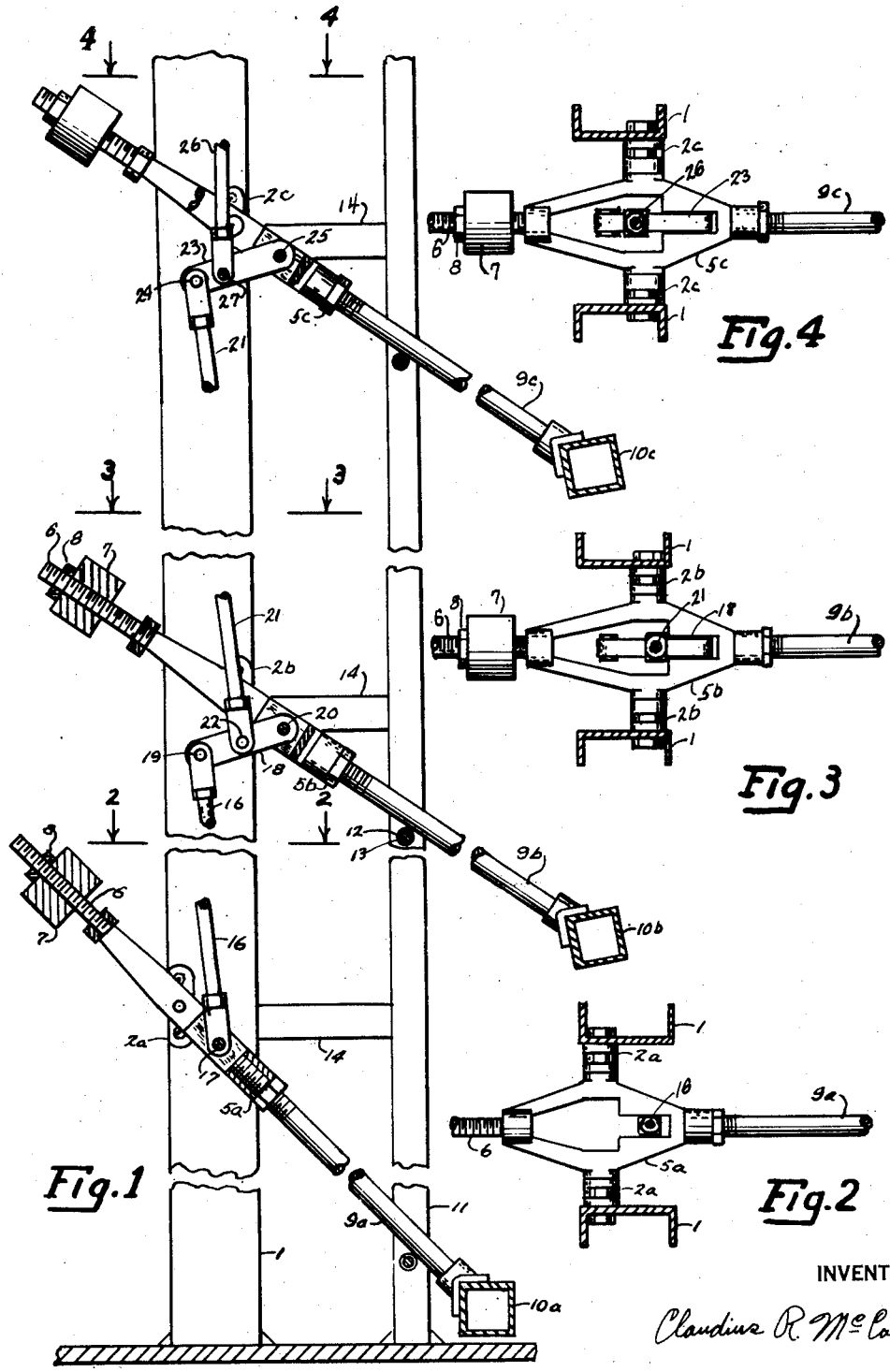

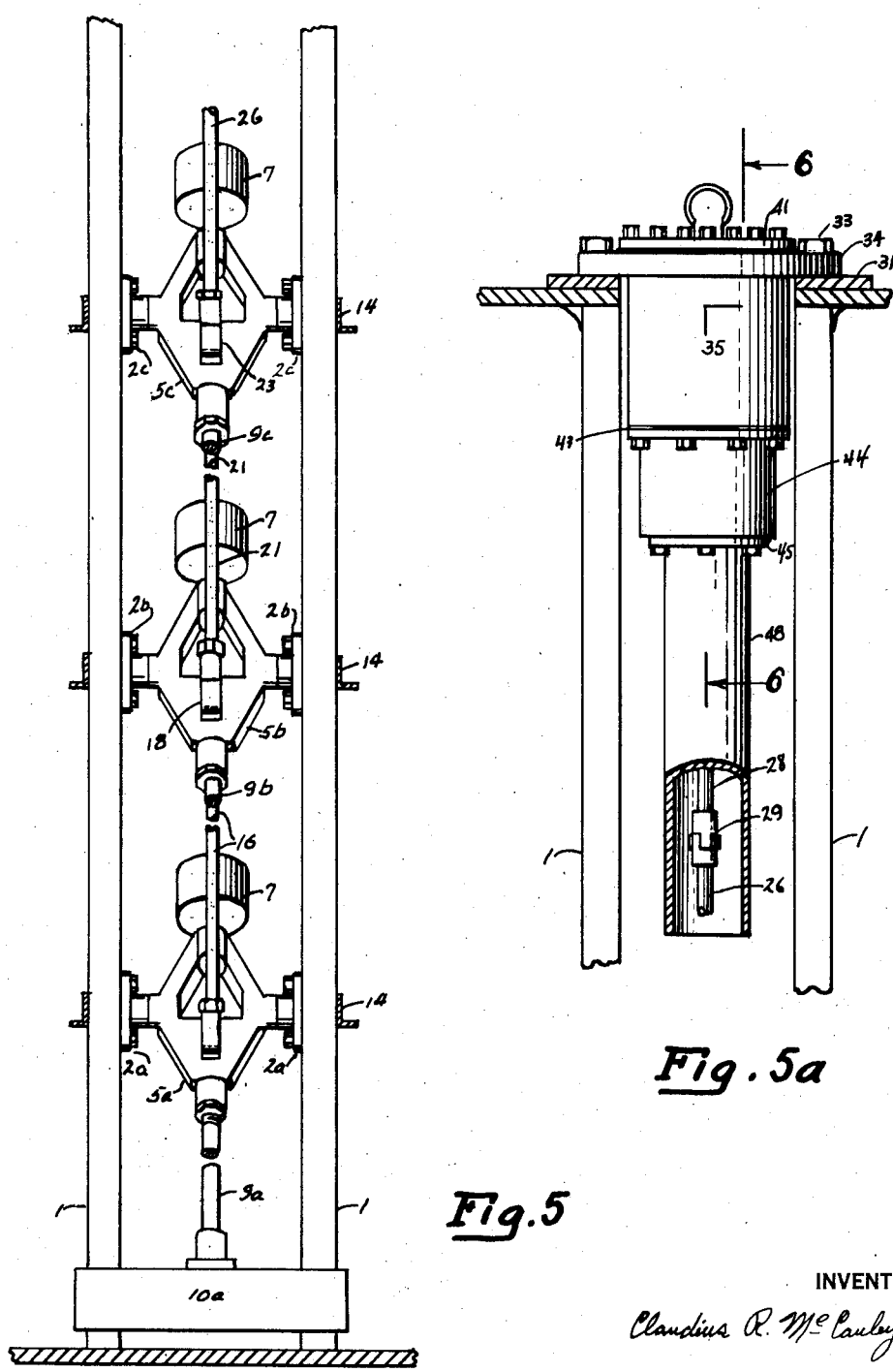

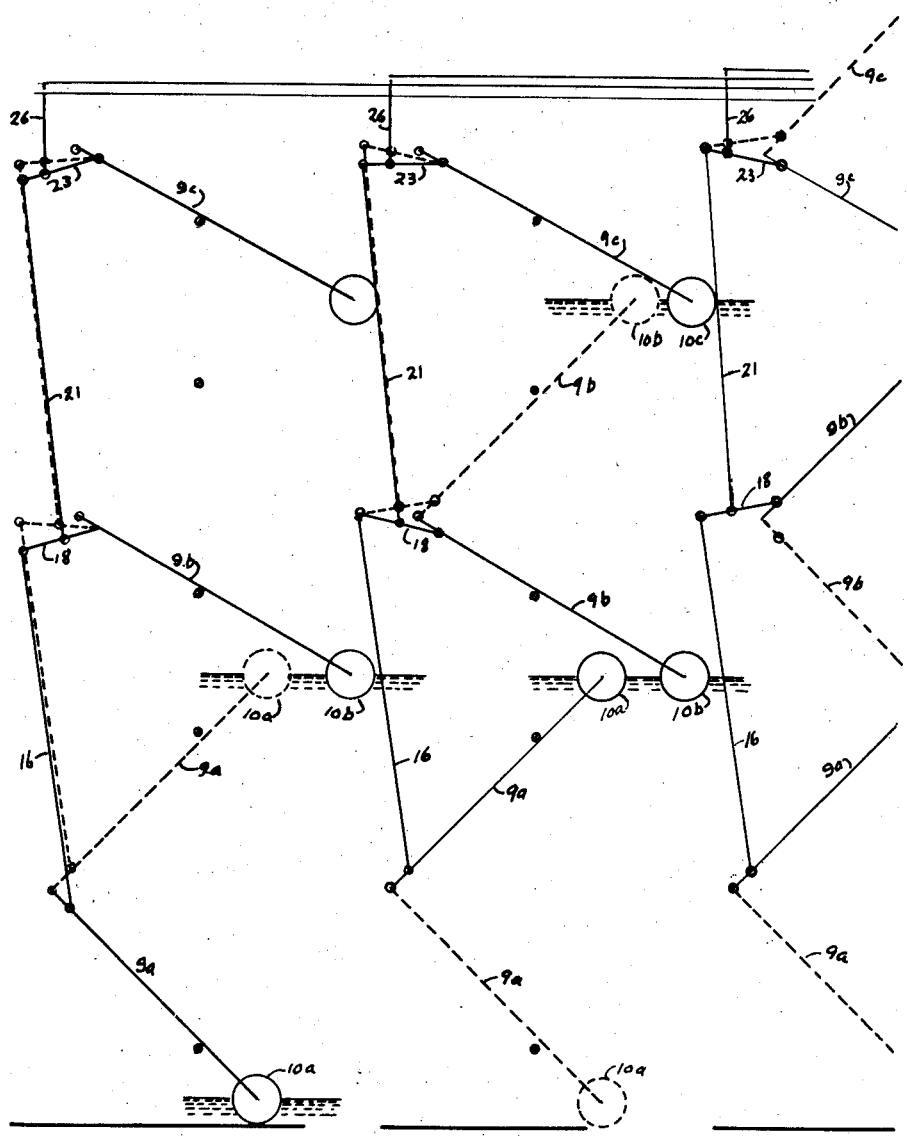

2,474,154

UNITED STATES PATENT OFFICE 2,474,154

LIQUID LEVEL TRANSLATING MEANS

Claudius R. McCauley, New Orleans, La.

Application July 20, 1945, Serial No. 606,246

7 Claims. (Cl. 73—311)

The present invention consists of a plurality of buoyant members in the nature of floats in a deep tank, responsive to different ranges of change of liquid level and a system of links and levers for transmitting a movement to a brush member for the purpose of indicating liquid level. The invention is designed for use with my liquid level indicator for tanks shown and described in my application Serial No. 598,079 filed June 7, 1945, but is not restricted in its usefulness to such mechanism, as the invention is susceptible of being used in any mechanism in which it is desired to produce a motion that is proportional to the changes of liquid level.

The invention is adapted for use in deep tanks aboard ships where the depth may be anywhere from ten to fifty feet or more. The floats are vertically spaced and arranged to be successively responsive to the changes in the liquid level throughout substantially the entire depth of the tank, whereby the quantity of liquid in the tank may be easily determined.

One object of the invention is to provide a liquid level translating means that will cover the entire depth of the tank and will reliably produce a motion of a member that will be proportional to the change in liquid levels in a tank.

Another object of the invention is to provide a liquid level translating means consisting of a plurality of vertically spaced floats responsive to changes of liquid level in successive ranges of liquid level and a means for translating the motion produced by successive floats into motion of a member that is proportional to the change in liquid level.

Another object of the invention is to provide an explosion proof sealing means between the tank and a switch housing where the rod penetrates the housing.

Other objects of the invention will at once appear obvious upon a reading of the specification taken with the disclosure of the accompanying drawings in which;

Fig. 1 is a side elevational view partly in section showing the arrangement of floats, levers, and links.

Figs. 2, 3, and 4, are each sectional views taken respectively on lines 2—2, 3—3, and 4—4, of Fig. 1.

Fig. 5 is a front elevational view, partly in section of the arrangement shown in Fig. 1.

Fig. 5a is a front elevational view of the top end of the arrangement shown in Fig. 5.

Figure 6:
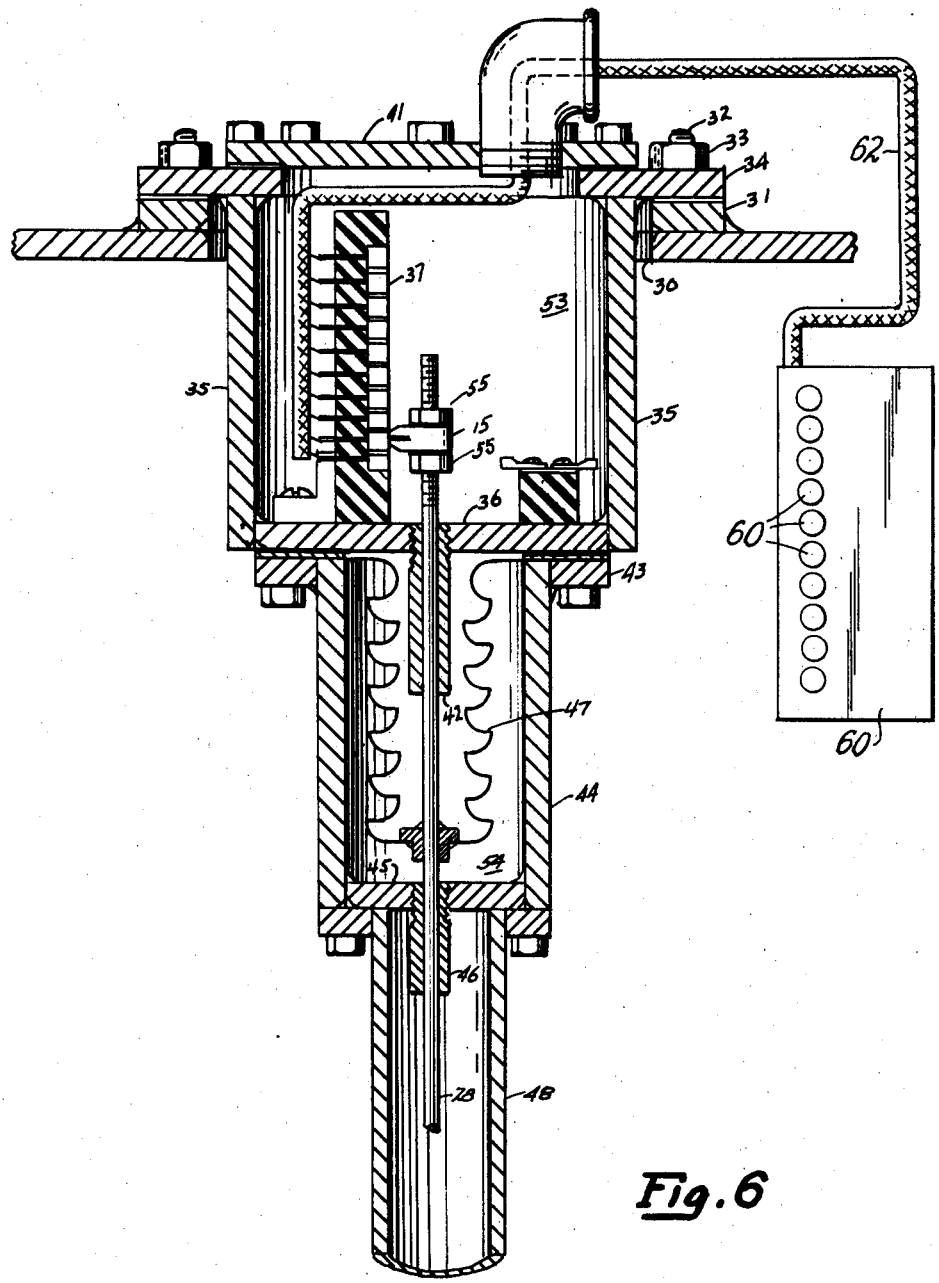
Fig. 6 is a sectional view of the arrangement shown in Fig. 5a and taken on line 6—6 of Fig. 5a, and showing diagrammatically the hookup between the contact segments and an indicator.

Figs. 7, 8, and 9, are one line diagrams of the floats and linkage illustrating the successive positions of the linkage for successive operation of the floats.

Referring to Figs. 1 and 2, there is shown a tank in which there is provided a supporting means for a plurality of pivotally supported floats consisting of a pair of channels 1, 1 spaced from each other horizontally and extending vertically. The ends of the channels 1, 1 are welded to the tank as shown in Figs. 5 and 5a. In the illustrated embodiment, the inwardly facing web surfaces of the channels 1, 1 have three sets of bearing bolted thereto and arranged in spaced relation vertically of the channels. The lower set of bearings 2a are positioned near the rear edge of the channels 1, 1 while the sets of bearings 2b and 2c are positioned near the front edge of the web of the channels 1, 1.

The bearings 2a, 2b, and 2c, each carry respectively a frame member 5a, 5b, and 5c, which have journals fitting in the bearing providing a pivotal support for the frames. To one end of the frames 5a, 5b, and 5c, is respectively connected a rod 9a, 9b, and 9c, the outer ends of which are respectively connected to floats 10a, 10b, and 10c. The other ends of the frames 5a, 5b, and 5c, each have connected thereto a threaded rod 6 on which is adjustably threaded a counter-weight 7, locked in an adjusted position on the rod 6 by a lock-nut 8. The counter-weights 7 provide a means whereby the weights of the rods 9a, 9b, and 9c, and the floats 10a, 10b, and 10c, may be partially balanced so that the floats will ride in the liquid of the tank at such height that the plane of the liquid surface will pass through the center of gravity of the floats.

The floats 10a, 10b, and 10c, are each constructed in the form of a metal box having a square cross-section and a comparatively long length. The structure provides for a maximum upward thrust to be exerted by the liquid on the floats without a substantial change in the draft of the floats. The rods 9a, 9b, and 9c, are connected to the floats at a juncture of the side walls thereof and mid-way between the ends thereof. The angle between the box-like floats and the rods to which they are connected is made such that when the floats are in their upper and lower positions of movement, one side of the float will be substantially parallel with the top and the bottom of the tank. This is particularly desired in the arrangement of the uppermost and the lowermost floats, so that they may approach as close to the top and bottom of the tank as possible and secure a maximum coverage of the tank depth by float movement.

The rods 9a, 9b, and 9c, are vertically guided in their movement by a pair of angle bars 11, 11, one engaging on each opposite side of the rods. The angle bars 11, 11 are welded at their ends to the tank and are braced from the channels 1, 1 intermediate their ends by suitable vertically spaced braces 14, fabricated from angle bars and welded at their ends to the channels 1, 1 and the angle bars 11, 11. The horizontal spacing of the angle bars 11, 11 is maintained throughout their vertical lengths by a plurality of sleeve-like members 12 of uniform length fitted snugly between the angle bars and held in place by a machine bolt 13 that passes through the angle bars 11, 11 and the sleeves 12. The vertical spacing of the sleeves is made such that they act as stop members to limit the range of movement of the rods 9a, 9b, and 9c. The range of movement of the rod 9a, is an angle of ninety degrees of forty-five degrees above and below its horizontal position. The rods 9b, and 9c, have a range of movement that is forty-five degrees above the horizontal position of the rods but a range of movement below the horizontal position of the rods that is somewhat less than forty-five degrees. This smaller range of movement below their horizontal position is made such, so as to position the floats 10b and 10c horizontally more remote from the channels 1, 1 while the floats are in their lower positions. As will be seen in Figs. 7 to 9 inclusive, the position of the float 10b when in its lower position, will be in front of the float 10a when it is in its upper position and the centers of gravity of the two floats will lie in the plane of the liquid surface. Also the position of the floats 10c when in its lower position will be in front of the float 10b when it is in its upper position and the centers of gravity of the floats will lie in the plane of the liquid surface. As the float 10a reaches its upper limit of movement, carried thereto by a rising liquid level, the float 10b becomes buoyant. A continued rise of liquid level will hold the float 10a against its upper stop member and will carry the float 10b to its upper limit of movement, where the rod 9b engages a stop member 12 and further upward movement ceases. At the instant the rod 9b engages the stop 12, the float 10c becomes buoyant and a further rise in the liquid level will hold the rod 9b against the stop 12 and will carry the float 10c to its upper limit of movement. A lowering liquid level will perform the aforesaid operation in reverse.

The vertical component of the motion of the floats is imparted by a system of levers and links to a movable brush member 15 to be later described.

As most clearly shown in Figs. 1 and 5, a rod 16 is pivotally connected at its lower end directly to the frame member 5a at a point 17 spaced from the bearing 2a distance depending on the amount of movement desired. The upper end of the rod 16 is pivotally connected to the rear end of the floating lever 18 at a point 19. The front end of the lever 18 is pivotally connected at a point 20 to the frame member 5b. The distance between the axis of the set of bearings 2b and the axis of the point of connection 20 is equal to the distance between the axis of the set of bearings 2a and the axis of the point of connection 17. A second rod 21 is pivotally connected at its lower end to the floating lever 18 at a point midway between the points of connection 19 and 20. The upper end of the rod 21 is pivotally connected to the rear of a second floating lever 23 at a point 24, the front end of which is pivotally connected to the frame 5c at a point 25. The distance between the axis of the bearing 2c and the axis of the connection 25 is made the same as the distance between the axis of the bearing 2a and the connection 17. The distances need not be the same. All that is required is that the ratio of the distance between the axis of the bearings and the point of connection on the frame to the distance between the axis of the bearing and the center of gravity of the floats be maintained the same for all frames. A third rod 26 is pivotally connected at its lower end to the second floating lever 23 at a point 27 which is spaced from the point of connection 25 of the floating lever 23 with the frame 5c a distance equal to two-thirds the distance between the connections 24 and 25. The upper end of the rod 26 is pivotally connected to the lower end of a rod 28 at 29. It will be clearly seen in Figs. 7 to 9 inclusive, that the vertical motion imparted to the rod 16 by the float member 10a will be proportional to the ratio of the distance between the axis of the bearing 2a and the point of connection 17 to the distance between the axis of the bearing 2a and the center of gravity of the float 10a. The vertical motion of the rod 16 is imparted to the rear end of the lever 19 which pivots about the connection 20, and which imparts a motion to the rod 21 in a vertical direction equal to one-half the amount of motion imparted to the rod 16 for equal changes in liquid level. The rod 21 imparts its motion to the rear end of the floating lever 23 which pivots about its point of connection 25 with the frame 5c to impart a vertical motion to the rods 26 and 28 equal to one-third the motion imparted to the rod 16 by the float 10a.

When the liquid level rises to the point to position the float 10a at its upper limit of motion, the motion of the rod 16 ceases. A continued rise in the liquid level will carry the float 10b towards its upper limit of motion. During the motion of the rod 9b, the floating lever 18 pivots about the point of connection 19 and imparts a motion to the rod 21 which will be equal to the motion imparted thereto while the float 10a was moving, that is, for equal changes of liquid level. This motion will result in a motion of the rods 26 and 28 equal to that previously imparted thereto by the float 10a for equal changes in liquid level. When the liquid level rises to the point where the rod 9b engages the stop member, further movement of the float 10b ceases and the motion of the rod 21 ceases. At this instant, the float 10c becomes buoyant and is carried towards its upper limit of movement. The motion imparted to the rods 26 and 28 by the motion of the float 10c will be the same as the motion imparted to these rods by the float 10a for equal changes of liquid level. No matter which float is operating the same amount of motion will be imparted to the rod 28 for equal increments of change of liquid level.

In instances where the depth of the tank is greater than that for which a three float arrangement is designed a fourth, fifth, or sixth float may be added. Each succeeding float will have a frame member, a floating lever, and links to connect the floats to the brush member 15 and to impart motion thereto. The point of connection of the bottom ends of the links with the floating levers will be at a distance equal respectively to three-fourths, four-fifths, and five-sixths the distance between the points of end connection with the floating lever from the point of connection of the floating lever with the frame member. Each time a float is added, the increments of movement of the brush member 15 is reduced unless the ratio of the distance between the axis of the bearing and the point of connection with the frame member of the floating lever to the distance from the axis of the bearings to the center of gravity of the floats is increased. There is a distinct advantage in the reduction of the increments of movement of the brush member 15 for equal changes of liquid level, in that the overall length of the row of contact segments 37 may be kept within reasonable limits no matter what the depth of the tank may be.

Referring to Figs. 5a and 6, the top of the tank is penetrated to form a circular aperture 30 through which a switch housing may project into the tank. The edge of the aperture is re-inforced by an annular ring 31 welded to the top side of the tank top. The annular ring 31 is provided with circumferentially spaced threaded bores to receive threaded studs 32 having nuts 33. The housing has a top plate 34 fastened to the annular ring 31 by the studs 32 and nuts 33 and supports the rest of the switch housing in suspension. The usual gasket may be interposed between the plate 34 and the ring 31 to form a gas and liquid tight joint. The side walls of the switch chamber 53 is formed by a cylindrical wall member 35 welded at its upper end to the underside of the plate 34 and having a circular bottom plate member 36 welded thereto at its lower end.

A bellows housing is secured to the underside of the switch housing and consists of a cylindrical wall 44 having a flange 43 welded to its upper end to provide a means of connection whereby it may be secured to the switch housing. The lower end of the wall 44 is closed by a plate 45 welded thereto to form a gas tight chamber. The plates 36 and 45 are bored and threaded in alignment to respectively receive sleeve members 42 and 46 of substantial length which encircle the rod member 28 and acts as guide bearing members with respect thereto. Within the bellows housing is a bellows member 47 having a lower circular wall member connected to the rod 28 in a gas tight manner. The upper end of the bellows member 47 has an outwardly extending flange adapted to be engaged on opposite sides thereof by a gasket and to be clamped between the flange 43 and the plate 36.

The purpose of the bellows 47 is to provide a gas tight seal between the tank and the switch chamber 53. This will prevent any explosive gases from entering the switch chamber 53 from the tank and where an electric spark could cause an explosion.

The structure of the chamber 53 and 54 are such as to withstand the full explosive force that may be created should gas leak into the chambers and an explosion occur, so that no transmitted igniting flame will enter the tank.

Should the bellows become fractured in service and an explosive mixture should leak into the switch housing and become ignited, the disposition of the sleeves are such that the flame would be cooled down in passing between them and the rod 28 so that no ignition could be transmitted along the rod 28. The provision of the bellows to first provide against leakage of a gas mixture into the switch chamber 53 and the sleeves that will cause the cooling of any flame resulting from an explosion, provides a double protection against fire in the tank.

The lower end of the bellows housing is connected to the upper end of a pipe carrying a flange bolted to the underside of the bellows housing. The pipe 48 extends down into the tank and has a lower open end. The purpose of the pipe 48 is to form a trap for gases therein when the lower end becomes submerged in the liquid to prevent the liquid level from reaching the sleeve 46.

The upper end of the rod 28 is threaded to receive a brush member 15. The brush member 15 is adjustably secured to the end of the rod by locknuts 55, whereby the position of the brush relative to the position of the rod 28 may be adjusted. The brush slidably engages a row of contact segments 37 consisting of a plurality of segments or bars having mica insulation therebetween. The row of contact segments 37 and brush 15 constitute a switching means for operating a series of lights 61 mounted in an indicator housing 60. The lights 61 are connected to the contact segments 37 by means of the cable 62. This structure as well as the circuit for operating the same is described and claimed in my copending application Serial No. 598,079, filed June 7, 1945.

The vertical movement of the brush means constitutes an indication of the liquid level within the tank. The row of contact segments constitutes a part of the means for transmitting the indication to a remote point.

Having described my invention and the mode of operation thereof, what I desire to secure by Letters Patent is set forth in the following claims:

1. In a liquid level translating means, a plurality of vertically spaced pivotally mounted float means carried by a support and successively operable in response to changes in liquid level, a first floating lever pivotally connected at one end to the second vertically spaced float means, means connecting the other end of said floating lever to the lower float means, a second floating lever pivotally connected at one end to a third vertically spaced float means, means connecting the other end of said second floating lever to the midpoint of the first floating lever, means movable in response to liquid level, and means connecting said last named means to said second floating lever at a point spaced from the pivotal connection of said floating lever with the third vertically spaced float means, a distance equal to two-thirds the distance between the pivotal connection of said second floating lever with the float means and the point of connection of the means connecting the other end of said floating lever to the first floating lever, whereby successive operations of the float means will impart equal increments of movement for equal changes of liquid level throughout substantially the entire change of depth to the means movable in response to liquid level.

2. In a liquid level translating means, a plurality of vertically spaced pivotally mounted float means carried by a support, a counterweight connected to each of said float means for partially balancing the weight of said float means, a first floating lever pivotally connected at one end to the second vertically spaced float means, means connecting the other end of said floating lever to the lower float means, a second floating lever pivotally connected at one end to a third vertically spaced float means, means connecting the other end of said second floating lever to the midpoint of the first floating lever, means movable in response to liquid level, and means connecting said last named means to said second floating lever at a point spaced from the pivotal connection of said floating lever with the third vertically spaced float means a distance equal to two-thirds the distance between the pivotal connection of said second floating lever with the float means and the point of connection of the means connecting the other end of said floating lever to the first floating lever, whereby successive operations of the float means will impart equal increments of movement for equal changes of liquid level to the means movable in response to changes of liquid level.

3. In a liquid level translating means, a switch housing, a switch means movably mounted within said switch housing, a plurality of pivotally mounted vertically spaced float means on a support and responsive successively to changes in liquid level, a first floating lever pivotally connected at one end to the second vertically spaced float means, means pivotally connecting the other end of said floating lever to the first float means, a second floating lever pivotally connected at one end to the third vertically spaced float means, means connecting the other end of said second floating lever to the midpoint of said first floating lever, a rod extending into said switch housing and connected at its upper end to said switch means, means connecting said rod to said second floating lever at a point spaced from the pivotal connection of said second floating lever with the third vertically spaced float means a distance equal to two-thirds the distance between the pivotal connection and the point of connection at the opposite end of said floating lever, a sealing means encircling said rod connected at its lower end to said rod and at its upper end to said switch housing in a gas tight manner to prevent leakage of gas into said switch housing and means providing a housing for said sealing means.

4. A liquid level translating means comprising, a plurality of frame members pivotally mounted and vertically spaced on a support, a float means connected to one end of each of said frames, a counter-weight adjustably connected to the other end of each of said frames, a floating lever pivotally connected at one end to the float end of each of said frame members except the lowermost frame member, a link means conecting the float end of the lower frame member to the other end of the first vertically spaced floating lever, other link means connected at their upper ends to the other ends of the other floating levers and at their lower ends to the next lower floating lever at a point intermediate the ends thereof, the point of connection of each link means with the next lower floating lever being spaced from the point of connection of said floating lever with the frame member a distance determined by the ratio of the vertical number of the floating lever to the vertical number of the frame member multiplied by the distance between the end connections of the floating lever and means connected to the upper end of the uppermost link means and movable in response to a change of liquid level.

5. In a level measuring device of the type described for measuring a liquid level in a tank containing liquid, the combination of a plurality of float and linkage systems mounted at different levels in the tank, each system comprising a substantially axially movable member and a float controlled by the liquid level to be detected and operatively connected to the member for axial displacement thereof corresponding to a movement of the respective float, each of said floats being mounted and positioned to respond to liquid level changes within a predetermined range, and linkage means mechanically interconnecting said members for transmitting axial displacement of a member to the member forming part of the float and linkage system mounted at the next succeeding higher level in the tank; and an indicating system operatively coupled with the member of the float and linkage system mounted at the highest level and constructed to be controlled by the total movement of all the float and linkage systems, thereby indicating the liquid level in the tank through the entire depth thereof.

6. In a level measuring device of the type described for measuring a liquid level in a tank containing liquid, the combination of a plurality of float and linkage systems mounted at different levels in the tank, one substantially above the other, each system comprising a rod mounted for substantial axial movement, a float controlled by the liquid level to be detected and operatively connected to the rod for axial displacement thereof corresponding to a movement of the respective float, each of said floats being mounted and positioned to respond to liquid level changes, a stopping means arresting each of said floats in fixed end positions for limiting movement of each float to a predetermined range of liquid level changes, and linkage means mechanically interconnecting said rods for transmitting axial displacement of a rod to the rod forming part of the float and linkage system mounted at the next succeeding higher level in the tank; and an indicating system operatively coupled with the rod of the float and linkage system mounted at the highest level and constructed to be controlled by the total movement of all the float and linkage systems, thereby indicating the liquid level in the tank throughout the entire depth thereof.

7. In a liquid level translating means, means responsive to change in liquid level, a plurality of vertically spaced float means carried by a support and successively operable by changes in liquid level, a floating lever pivoted at one end to an intermediate float means, means connecting the other end of said floating lever to a lower float means, a second floating lever pivoted at one end to a higher float means, means connecting the other end of said second floating lever to and intermediate the ends of the first floating lever, and means connecting the second floating lever to the means movable in response to a change of liquid level.

CLAUDIUS R. McCAULEY.

REFERENCES CITED

The following references are of record in the file of this patent:

UNITED STATES PATENTS

| Number | Name | Date |
| --- | --- | --- |
| 1,560,318 | Reed | Nov. 3, 1925 |
| 1,984,670 | Williams | Dec. 18, 1934 |
| 2,098,085 | D'Arcey | Nov. 2, 1937 |